US010470116B1

(12) United States Patent
Liu et al.

(10) Patent No.: US 10,470,116 B1
(45) Date of Patent: Nov. 5, 2019

(54) SYSTEMS AND METHODS FOR DETERMINING AN ACCESS NODE FOR A WIRELESS DEVICE

(71) Applicant: Sprint Spectrum LP, Overland Park, KS (US)

(72) Inventors: Chunmei Liu, Great Falls, VA (US); Daniel Vivanco, Sterling, VA (US); Krishna Sitaram, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 1246 days.

(21) Appl. No.: 14/269,374

(22) Filed: May 5, 2014

(51) Int. Cl.
*H04W 48/20* (2009.01)
*H04W 36/00* (2009.01)
*H04W 52/24* (2009.01)

(52) U.S. Cl.
CPC ....... *H04W 48/20* (2013.01); *H04W 36/0072* (2013.01); *H04W 36/0079* (2018.08); *H04W 36/0083* (2013.01); *H04W 52/245* (2013.01)

(58) Field of Classification Search
CPC ............. H04W 36/30; H04W 72/0426; H04W 52/143; H04W 36/0094; H04W 24/08; H04W 36/08; H04W 24/10; H04W 16/08; H04W 36/385; H04W 36/22; H04W 36/0083; H04W 36/32; H04W 84/045; H04W 36/0079; H04W 36/0072
USPC .......................... 370/331, 332; 455/436, 423
See application file for complete search history.

(56) References Cited

U.S. PATENT DOCUMENTS

| 6,144,861 | A  | * | 11/2000 | Sundelin  | H04W 52/40 455/442 |
| 6,539,206 | B1 | * | 3/2003  | Min       | H04W 52/325 370/331 |
| 9,655,025 | B1 | * | 5/2017  | Vivanco   | H04W 36/34 |
| 2004/0043751 | A1 | * | 3/2004 | Amalfitano | H04W 76/02 455/403 |
| 2004/0116133 | A1 | * | 6/2004 | Kalhan    | H04W 36/30 455/456.2 |
| 2004/0242257 | A1 | * | 12/2004 | Valkealahti | H04W 16/06 455/522 |

(Continued)

OTHER PUBLICATIONS

ETSI TS 136 331 V10.5.0 (Mar. 2012); LTE; Evolved Universal Terrestrial Radio Access (E-UTRA); Radio Resource Control (RRC); Protocol specification (3GPP TS 36.331 version 10.5.0 Release 10).*

*Primary Examiner* — Raj Jain

(57) ABSTRACT

Systems and methods are described for determining an access node for a wireless device. A first signal may be transmitted from a first access node with an increased signal level. An indication of a first adjustment factor based on the increased first signal level may also be transmitted from the first access node. Signal information may then be received from a wireless device, where the signal information includes a determined first signal level associated with the first access node and a determined second signal level associated with a second access node. The determined first signal level from the signal information may comprise a received signal level of the first signal decreased by the first adjustment factor. Based on the signal information, one of the first access node and the second access node may be selected for communication with the wireless device and the wireless device may be instructed to communicate with the selected access node.

20 Claims, 13 Drawing Sheets

(56) References Cited

U.S. PATENT DOCUMENTS

| | | | | |
|---|---|---|---|---|
| 2008/0085708 A1* | 4/2008 | Kogure | H04W 36/30 | 455/436 |
| 2010/0150069 A1* | 6/2010 | Fang | H04L 1/1607 | 370/328 |
| 2011/0003597 A1* | 1/2011 | Budic | H04W 52/143 | 455/450 |
| 2011/0194551 A1* | 8/2011 | Lee | H04B 7/0626 | 370/342 |
| 2011/0255514 A1* | 10/2011 | Olofsson | H04W 72/0426 | 370/331 |
| 2011/0319025 A1* | 12/2011 | Siomina | H04B 7/024 | 455/63.1 |
| 2012/0039287 A1* | 2/2012 | Ko | H04L 5/0053 | 370/329 |
| 2012/0082028 A1* | 4/2012 | Kojima | H04W 36/22 | 370/230 |
| 2012/0094672 A1* | 4/2012 | Hunukumbure | H04W 24/08 | 455/436 |
| 2013/0072184 A1* | 3/2013 | Kusano | H04W 16/28 | 455/423 |
| 2013/0143555 A1* | 6/2013 | Singh | H04W 36/0077 | 455/434 |
| 2013/0273919 A1* | 10/2013 | Sashihara | H04W 36/0083 | 455/436 |
| 2013/0301434 A1* | 11/2013 | Krishnamurthy | H04L 1/0026 | 370/252 |
| 2013/0301451 A1* | 11/2013 | Siomina | H04W 24/00 | 370/252 |
| 2014/0057634 A1* | 2/2014 | Chang | H04W 36/32 | 455/437 |
| 2014/0133465 A1* | 5/2014 | Johansson | H04W 24/04 | 370/332 |
| 2014/0148174 A1* | 5/2014 | Teyeb | H04W 36/0083 | 455/441 |
| 2014/0148212 A1* | 5/2014 | Gusavac | H04W 52/143 | 455/522 |
| 2015/0133119 A1* | 5/2015 | Huang | H04W 36/0094 | 455/436 |
| 2015/0146545 A1* | 5/2015 | Davydov | H04W 24/08 | 370/252 |
| 2015/0181481 A1* | 6/2015 | Masini | H04W 36/0083 | 455/436 |
| 2016/0014646 A1* | 1/2016 | Yiu | H04W 24/04 | 370/331 |

* cited by examiner

SYSTEMS AND METHODS FOR DETERMINING AN ACCESS NODE FOR A WIRELESS DEVICE

TECHNICAL BACKGROUND

Telecommunication systems, such as cellular networks or other wireless networks, use wireless signals to establish communication channels between various network devices. For example, an access node may transmit a reference signal or a pilot signal over a signal radius, and one or more wireless devices within the signal radius may attempt to establish a connection with the access node based on the reference signal.

In certain circumstances, it may be advantageous to boost or to increase the power of the reference signal transmitted from an access node. For example, where a wireless device uses a reference signal for channel estimation, increasing the reference signal strength can improve channel quality. Accordingly, power boosting may be performed at an access node such that the signal level of a reference signal, or pilot signal, transmitted by the access node is increased.

Overview

Systems and methods are described for determining an access node for a wireless device. A first signal comprising an increased signal level may be transmitted from a first access node. An indication of a first adjustment factor used to determine the increased first signal level may also be transmitted from the first access node. Signal information comprising a determined first signal level associated with the first access node and a determined second signal level associated with a second access node may be received from a wireless device, wherein the determined first signal level comprises a received signal level of the first signal decreased by the first adjustment factor. Based on the signal information, one of the first access node and the second access node may be selected for communication with the wireless device. The wireless device may be instructed to communicate with the selected access node.

DETAILED DESCRIPTION

Figure 1:
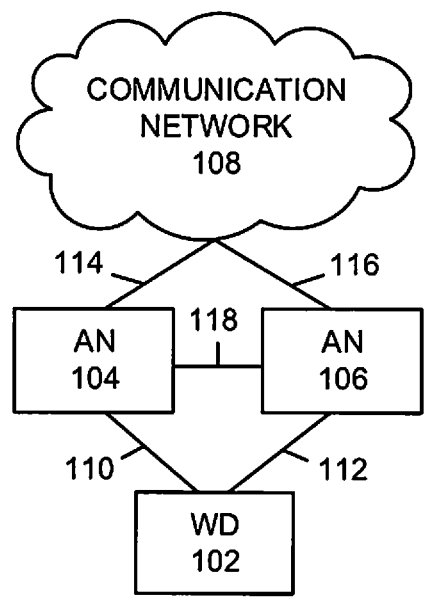
FIG. 1 illustrates an exemplary communication system to determine an access node for a wireless device.

FIG. 1 illustrates an exemplary communication system 100 to determining an access node for a wireless device comprising wireless device 102, access nodes 104 and 106, communication network 108, and communication links 110, 112, 114, 116, and 118. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 104, access node 106, and communication network 108 which are omitted for clarity, including additional processing nodes, routers, gateways, and physical and/or wireless data links for carrying data among the various network elements.

Wireless device 102 can be any device configured to communicate over communication system 100 using a wireless communication link. For example, wireless device 102 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with access nodes 104 and 106, any number of wireless devices can be implemented.

Access nodes 104 and 106 are network nodes capable of providing wireless communications to wireless device 102, and can be, for example, a base transceiver station, a radio base station, an eNodeB device, or an enhanced eNodeB device. Access nodes 104 and 106 may communicate with communication network 108 over communication links 114 and 116. Access nodes 104 and 106 may also communicate directly with each other over communication link 118. In an embodiment, access node 104 can comprise a serving access node for wireless device 102.

Although only two access nodes 104 and 106 are illustrated in FIG. 1, wireless devices 102 can be in communication with a plurality of access node. The plurality of access nodes can be associated with different networks and can support different communication protocols and radio access technologies.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other information, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or some other type of communication equipment, and combinations thereof.

Communication links 110, 112, 114, 116, and 118 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

Figure 2:
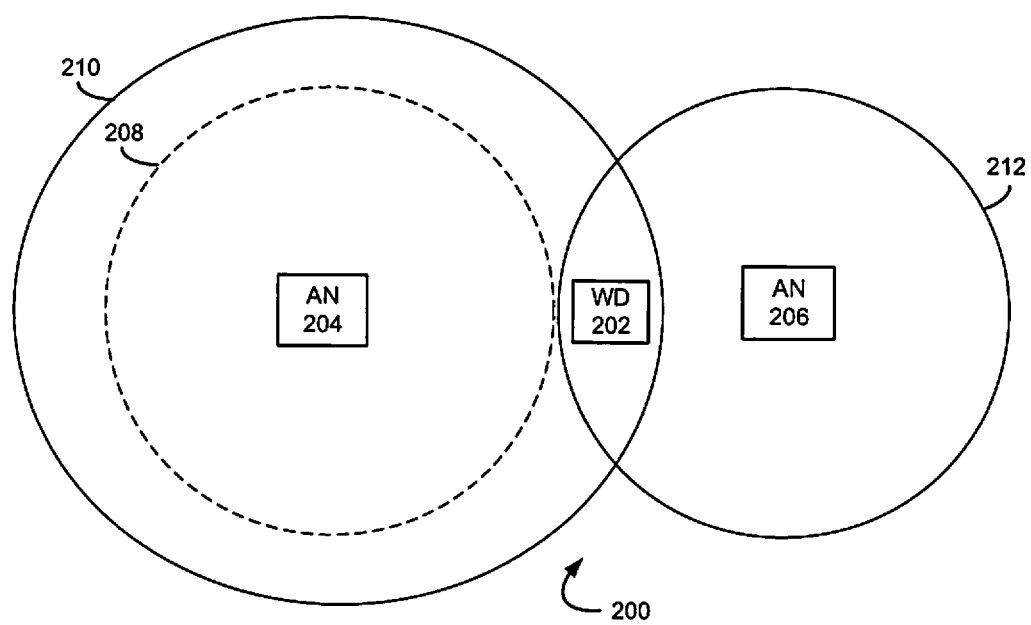
FIG. 2 illustrates another exemplary system to determine an access node for a wireless device.

FIG. 2 illustrates an exemplary communication system 200 for determining an access node for a wireless device. System 200 comprises wireless device 202, access nodes 204 and 206, and signal radii 208, 210, and 212. Wireless device 202 may comprise a device similar to wireless device 102 of FIG. 1. Similarly, access nodes 204 and 206 may comprise access nodes similar to access node 106 of FIG. 1. Access node 204 may comprise signal radii 208 and 210, and access node 206 may comprise signal radius 212.

A signal radius, or coverage radius, may comprise an area around an access node within which a wireless device can detect a signal transmitted form the access node. Signal radii 208 and 210 can comprise radii for reference signals, or pilot signals, transmitted from access node 204 and signal radius 212 can comprise a radius for a reference signal, or pilot signal, transmitted from access node 206.

In operation, wireless device 202 may establish communication with access node 204 such that access node 204 provides the wireless devices access to a communication network (such as communication network 108, illustrated in FIG. 1). Access node 204 may transmit a reference signal, or a pilot signal, over signal radius 208 to enable wireless device 202 to detect access node 204. When a wireless device, such as wireless device 202, detects the reference signal from access node 204, and it is determined that the reference signal from access node 204 meets a threshold signal level, wireless device 202 may attempt to establish communication with access node 204. For example, the signal level may be represented by received signal strength indication (RSSI), reference signal received power (RSRP), reference signal received quality (RSRQ), signal to interference plus noise ratio (SINR), or any other suitable metric.

In an embodiment, power boosting may be performed to transmit a reference signal, or pilot signal, from an access node with an increased signal level such that the power boosting increases the quality of service (QoS) experienced by wireless devices in communication with the access node. For example, a reference signal according to the 3GPP LTE protocol may be used for channel estimation and, ultimately, a boost in the reference signal power can be used to improve channel quality. These improved channel conditions lead to a greater ability to satisfy service conditions for the wireless devices in communication with the access node.

In an embodiment, power boosting may be performed at an access node to transmit a signal, such as a reference signal or a pilot signal, from the access node with an increased signal level and, thus, a greater signal radius. For example, power boosting may be performed in a multi-antenna configuration according to the 3GPP LTE protocol. An access node may comprise at least two antennas and may implement a Multiple Input Multiple Output (MIMO) protocol for sending (as well as receiving) signals. In an embodiment, when a first of the at least two antennas is transmitting a reference signal, the second antenna may not transmit a signal. Accordingly, when the first antenna is transmitting a reference signal, power boosting of the reference signal may be accomplished by using signal power of the second antenna for the reference signal transmitted from the first antenna.

In an example where an access node comprises a multi-antenna configuration, when a first antenna is transmitting a reference signal, power options may comprise: using power from a first antenna to transmit the reference signal; using power from a first antenna and a second antenna to transmit the reference signal; using power from a first antenna, a second antenna, and a third antenna to transmit the reference signal; using power from a first antenna, a second antenna, a third antenna, and a fourth antenna to transmit the reference signal, and so on. In an embodiment, a reference signal transmitted without a boosted power (e.g., using power from 1 antenna) may comprise a signal level of 1.5 dB. Accordingly, signal levels for transmitting a reference signal or pilot signal may comprise a signal level of 1.5 dB (power from 1 antenna), 3 dB (power from 2 antennas), 4.5 dB (power from 3 antennas), 6 dB (power from 4 antennas), and so on. Other suitable processes for increasing the transmitted signal level of a reference signal may also be implemented. With reference to FIG. 2, signal radius 208 may comprise a reference signal radius for access node 204 when power boosting is not performed, while signal radius 210 may comprise a reference signal radius for access node 204 when power boosting is performed.

In some scenarios, transmitting a reference signal with an increased power may cause interference with communicating wireless devices. For example, when power boosting is performed and the reference signal radius for an access node is expanded, other signals transmitted from the access node, such as bearer signals, control signals, and any other suitable signals, may not comprise such an expanded radius. This can result in the reference signal radius of an access node being larger than the signal radius for other signals. In this example, a wireless device that detects a reference signal from an access node performing power boosting may be out of range for other signals transmitted by the access node. In addition, the radius for signals transmitted from the wireless device may not be large enough to reach the access node performing power boosting.

In an embodiment, a handover to an access node performing power boosting may be attempted due to an increased reference signal level detected at a wireless device. For example, the wireless device may detect a reference signal from an access node performing power boosting at an increased signal level, and attempt a handover based on the detected signal level. Accordingly, the wireless device may commence a handover process and attempt to communicate with the power boosting access node to complete the handover. The handover may then fail because the wireless device may be out of range to perform the handover to the access node (e.g., signals transmitted from the wireless device may not comprise radii large enough to reach the access node and/or signals other than the reference signal transmitted from the access node may not comprise radii large enough to reach the wireless device).

In another embodiment, a wireless device may not be handed over from an access node performing power boosting based on an increased reference signal level detected at a wireless device. For example, a wireless device may be out of range for signals from the power boosting wireless device other than the reference signal (e.g., bearer signals, control signals, and the like), but the wireless device may not be handed over from the power boosting access node because of the increased reference signal level detected at the wireless device. Accordingly, a handover may be attempted, but the wireless device may already be out of the range necessary to successfully perform the handover, and the handover may therefore fail. These signal mismatches between reference signal radius and other signal radii can result in service interruptions such as dropped calls, lagging or poor quality media streams, or other service interruptions. In an embodiment, an access node that performs power boosting may provide a wireless device a mechanism to compensate for the received reference signal or pilot signal from that access node.

Systems and methods are described for determining an access node for a wireless device. A first signal may be transmitted from a first access node with an increased signal level. An indication of a first adjustment factor based on the increased first signal level may also be transmitted from the first access node. Signal information may then be received from a wireless device, where the signal information includes a determined first signal level associated with the first access node and a determined second signal level associated with a second access node. The determined first signal level from the signal information may comprise a received signal level of the first signal decreased by the first adjustment factor. Based on the signal information, one of the first access node and the second access node may be selected for communication with the wireless device and the wireless device may be instructed to communicate with the selected access node.

Figure 3:
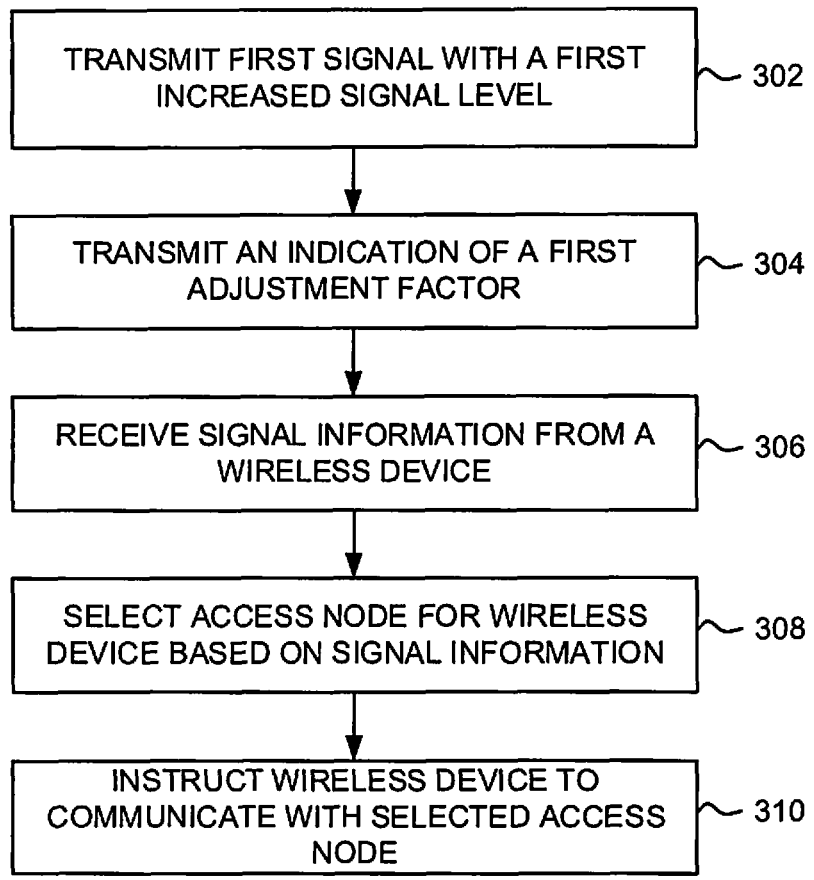
FIG. 3 illustrates an exemplary method of determining an access node for a wireless device.

FIG. 3 illustrates an exemplary method for determining an access node for a wireless device. The method will be discussed with reference to the exemplary communication system 200 illustrated in FIG. 2, however, the method can be implemented with any suitable communication system.

Referring to FIG. 3, at step 302, a first signal comprising an increased first signal level is transmitted from a first access node. For example, access node 204 may be performing power boosting and may transmit a reference signal or pilot signal with an increased signal level. The increased first signal level may comprise 3 dB, 4.5 dB, 6 dB, or any other suitable level. In an embodiment, signal radius 208 may illustrate the signal radius of a reference signal or pilot signal transmitted without an increased signal level and signal radius 210 may illustrate the signal radius of a reference signal or pilot signal transmitted with an increased signal level.

At step 304, an indication of a first adjustment factor based on the increased first signal level is transmitted. For example, a reference signal or pilot signal transmitted from access node 204 with an increased signal level (e.g. over signal radius 210) may be received at wireless device 202. Wireless device 202 may attempt a handover based on the received signal, however the attempt may end in failure because of a signal radius mismatch between a signal radius for the reference signal or pilot signal and signal radii for other signals (e.g., bearer signals, control signals, and the like). Accordingly, an adjustment factor may be determined such that the received signal level of a reference signal or pilot signal transmitted with an increased signal level may be adjusted.

In an embodiment, the adjustment factor may be based on the increased signal level for the reference signal or pilot signal. For example, where a reference signal is transmitted with a 3 dB signal level, an adjustment factor may be determined based on the 3 db signal level. Where a reference signal is transmitted with a 4.5 dB signal level, an adjustment factor may be determined based on the 4.5 dB signal level, and the adjustment factor based on the 4.5 dB signal level may be larger than the adjustment factor based on the 3 dB signal level.

At step 306, signal information comprising a determined first signal level associated with the first access node and a determined second signal level associated with a second access node is received from a wireless device, wherein the determined first signal level comprises a received signal level of the first signal decreased by the first adjustment factor. For example, wireless device 202 may receive a first signal, such as a reference signal or pilot signal, at a first received signal level from access node 204 and a second signal, such as reference signal or pilot signal, at a second received signal level from access node 206. In addition, the wireless device may receive the indication of the first adjustment factor from access node 204. The wireless device may then calculate a compensated first signal level by decreasing the received first signal level using the first adjustment factor.

In an embodiment, a reporting event may be triggered at the wireless device based on the compensated first signal level and the received second signal level, and a measurement report comprising the compensated first signal level and the received second signal level may be transmitted. The measurement report may be received by access node 204.

At step 308, based on the signal information, one of the first access node and the second access node may be selected for communication with the wireless device. For example, based on the determined first signal level and the determined second signal level, one of the first access node and the second access node may be selected. At step 310, the wireless device is instructed to communicate with the selected access node. For example, based on the selection from step 308, the wireless device may be instructed to communicate with one of access node 204 and access node 206.

Figure 4:
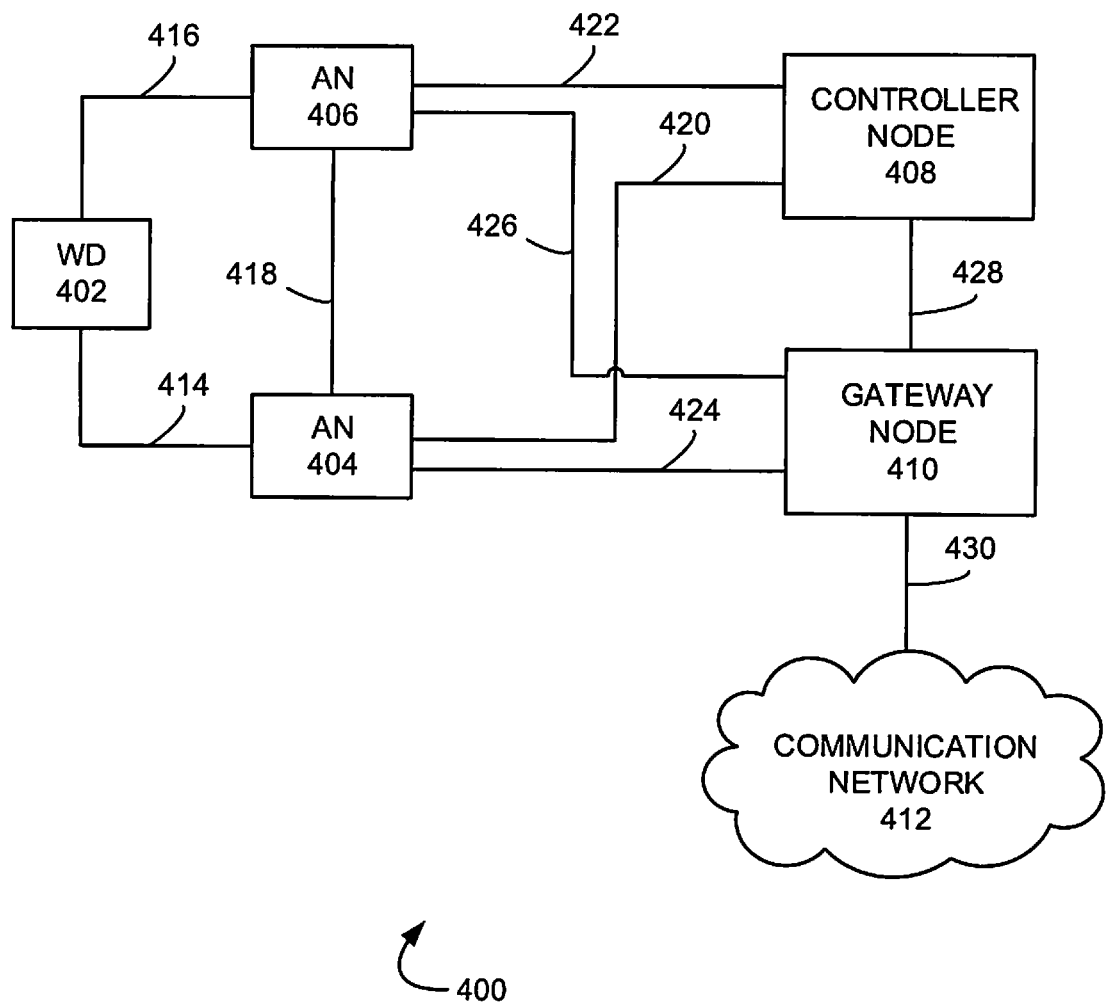
FIG. 4 illustrates another exemplary system to determine an access node for a wireless device.

FIG. 4 illustrates another exemplary communication system 400 to determine a communication access node for a wireless device. Communication system 400 may comprise a wireless device 402, access nodes 406 and 404, controller node 408, gateway node 410, communication network 412, and communication links 414, 416, 418, 420, 422, 424, 426, 428, and 430. Other network elements may be present in the communication system 400 to facilitate communication but are omitted for clarity, such as base stations, base station controllers, gateways, mobile switching centers, dispatch application processors, and location registers such as a home location register or visitor location register.

Wireless device 402 can be any device configured to communicate over communication system 400 using a wireless communication link. For example, wireless device 402 can include a cell phone, a smart phone, a computing platform such as a laptop, palmtop, or a tablet, a personal digital assistant, or an internet access device, and combinations thereof.

Access nodes 404 and 406 are network nodes capable of providing wireless communications to wireless device 402, and can be, for example, a base transceiver station, a radio base station, an eNodeB device, or an enhanced eNodeB device. In an embodiment, access node 404 can comprise a serving access node for wireless device 402. Access nodes 404 and 406 may communicate with controller node 408 over communication links 420 and 422, and with gateway node 410 over communication links 424 and 426. Access nodes 404 and 406 may also communicate directly with each other over communication link 418.

Controller node 408 can be any network node configured to manage services within system 400. Controller node 408 may provide other control and management functions for system 400. The controller node 408 can be a single device having various functions or a plurality of devices having differing functions. For example, controller node 408 can include at least one of a multi-cell/multicast coordination entity (MCE), a mobility management entity (MME), a radio network controller (RNC), a mobile switching center (MSC), and a combination thereof.

Controller node 408 can comprise a processor and associated circuitry to execute or direct the execution of computer-readable instructions to obtain information. Controller node 408 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 408 can receive instructions and other input at a user interface. Controller node 408 can comprise a processor and associated circuitry to execute or direct the execution of computer-readable instructions to obtain information.

Gateway node 410 is a network element which can comprise a processor and associated circuitry to execute or direct the execution of computer-readable instructions. Gateway node 410 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 410 can provide instructions to access nodes 404 and 406 related to channel selection in communications with wireless device 402. For example, gateway node 410 can comprise at least one of a serving gateway (SGW), a packet data network gateway (PDNGW), a cellular gateway (CGW), and a combination thereof.

Communication network 412 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 412 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 412 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 414, 416, 418, 420, 422, 424, 426, 428, and 430 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access nodes 404 and 406, controller node 408, gateway node 410, and communication network 412 which are omitted for clarity, including additional processing nodes, routers, gateways, and physical and/or wireless data links for carrying data among the various network elements.

Figure 5:
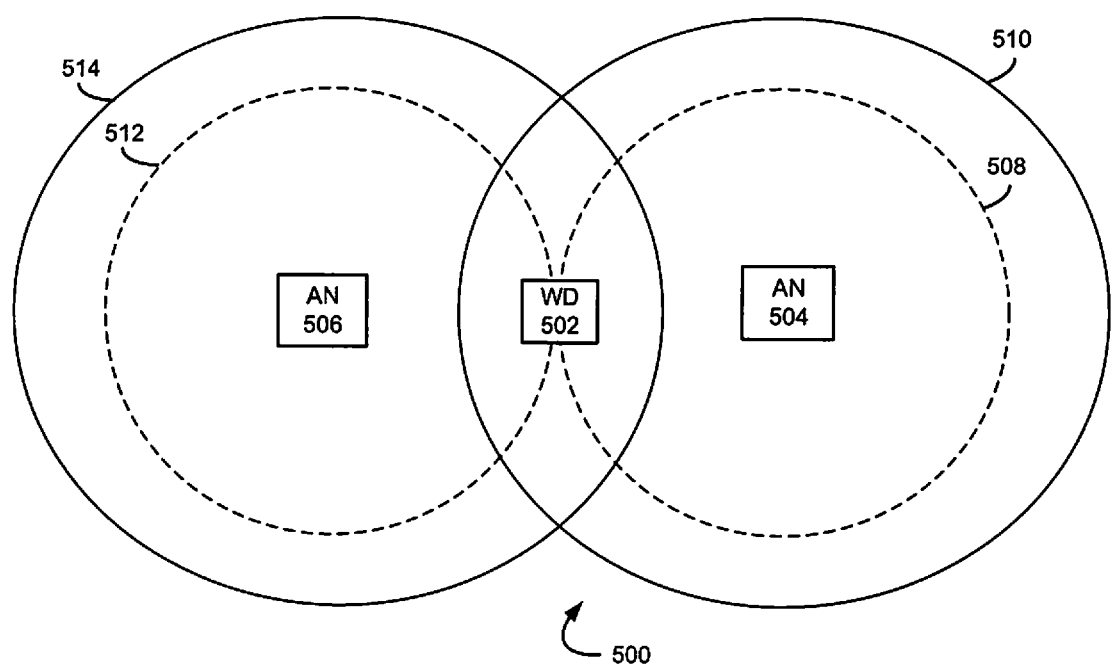
FIG. 5 illustrates another exemplary system to determine an access node for a wireless device.

FIG. 5 illustrates an exemplary communication system 500 for determining an access node for a wireless device. System 500 comprises wireless device 502, access nodes 504 and 506, and signal radii 508, 510, 512 and 514. Wireless device 502 may comprise a device similar to wireless device 402 of FIG. 4. Similarly, access nodes 504 and 506 may comprise access nodes similar to access node 404 of FIG. 4. Access node 504 may comprise signal radii 508 and 510, and access node 506 may comprise signal radii 512 and 514.

In operation, wireless device 502 may establish communication with access node 504 such that access node 504 provides the wireless devices access to a communication network (such as communication network 412, illustrated in FIG. 4). In an embodiment, one or more of access nodes 504 and 506 may perform power boosting, as described herein. For example, access node 504 may transmit a reference signal or pilot signal over signal radius 508 when power boosting is not performed and may transmit the reference signal or pilot signal over signal radius 510 when power boosting is performed. Similarly, access node 506 may transmit a reference signal or pilot signal over signal radius 512 when power boosting is not performed and may transmit the reference signal or pilot signal over signal radius 514 when power boosting is performed.

In some scenarios, transmitting a reference signal with an increased power may cause interference with communicating wireless devices. For example, when power boosting is performed and the reference signal radius for an access node is expanded, other signals transmitted from the access node, such as bearer signals, control signals, and any other suitable signals, may not comprise such an expanded radius. This can result in the reference signal radius of an access node being larger than the signal radius for other signals. In this example, a wireless device that detects a reference signal from an access node performing power boosting may be out of range for other signals transmitted by the access node. In addition, the radius for signals transmitted from the wireless device may not be large enough to reach the access node performing power boosting.

In an embodiment, a handover to an access node performing power boosting may be attempted due to an increased reference signal level detected at a wireless device. For example, the wireless device may detect a reference signal from an access node performing power boosting at an increased signal level, and attempt a handover based on the detected signal level. Accordingly, the wireless device may commence a handover process and attempt to communicate with the power boosting access node to complete the handover. The handover may then fail because the wireless device may be out of range to perform the handover to the access node (e.g., signals transmitted from the wireless device may not comprise radii large enough to reach the access node and/or signals other than the reference signal transmitted from the access node may not comprise radii large enough to reach the wireless device).

In another embodiment, a wireless device may not be handed over from an access node performing power boosting based on an increased reference signal level detected at a wireless device. For example, a wireless device may be out of range for signals from the power boosting wireless device other than the reference signal (e.g., bearer signals, control signals, and the like), but the wireless device may not be handed over from the power boosting access node because of the increased reference signal level detected at the wireless device. Accordingly, a handover may be attempted, but the wireless device may already be out of the range necessary to successfully perform the handover, and the handover may therefore fail. These signal mismatches between reference signal radius and other signal radii can result in service interruptions such as dropped calls, lagging or poor quality media streams, or other service interruptions. In an embodiment, an access node that performs power boosting may provide a wireless device a mechanism to compensate for the received reference signal or pilot signal from that access node.

Figure 6:
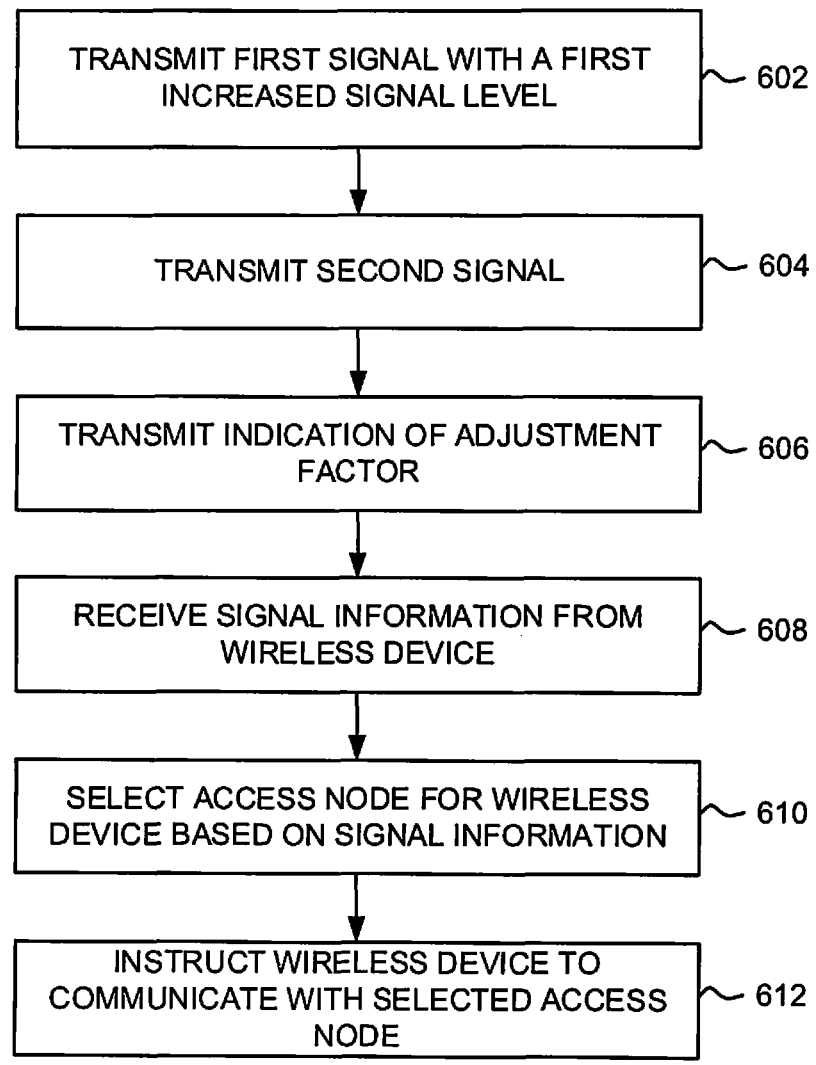
FIG. 6 illustrates another exemplary method of determining an access node for a wireless device.

FIG. 6 illustrates an exemplary method for determining an access node for a wireless device. The method will be discussed with reference to the exemplary communication system 500 illustrated in FIG. 5, however, the method can be implemented with any suitable communication system.

Referring to FIG. 6, at step 602, a first signal comprising an increased first signal level is transmitted from a first access node. For example, access node 504 may be performing power boosting and may transmit a reference signal or pilot signal with an increased first signal level. The increased first signal level may comprise 3 dB, 4.5 dB, 6 dB, or any other suitable level. In an embodiment, signal radius 508 may illustrate the signal radius of a reference signal or pilot signal transmitted without an increased signal level and signal radius 510 may illustrate the signal radius of a reference signal or pilot signal transmitted with an increased signal level.

At step 604, a second signal comprising a second signal level is transmitted from a second access node. For example, access node 506 may be performing power boosting and may transmit a reference signal or pilot signal with an increased second signal level. The increased second signal level may comprise 3 dB, 4.5 dB, 6 dB, or any other suitable level. In another example, access node 506 may not be performing power boosting. In an embodiment, signal radius 512 may illustrate the signal radius of a reference signal or pilot signal transmitted without an increased signal level and signal radius 514 may illustrate the signal radius of a reference signal or pilot signal transmitted with an increased signal level.

At step 606, an indication of a first adjustment factor based on the increased first signal level is transmitted. For example, a reference signal or pilot signal transmitted from access node 504 with an increased first signal level (e.g. over signal radius 510) may be received at wireless device 502. In some scenarios, wireless device 502 may attempt a handover based on the received signal, however the attempt may end in failure because of a signal radius mismatch between a signal radius for the reference signal or pilot signal and signal radii for other signals (e.g., bearer signals, control signals, and the like). Accordingly, a first adjustment factor may be determined such that the received signal level of a reference signal or pilot signal transmitted with an increased signal level may be adjusted.

In an embodiment, the adjustment factor may be based on the increased signal level for the reference signal or pilot signal. For example, where a reference signal is transmitted with a 3 dB signal level, an adjustment factor may be determined based on the 3 db signal level. Where a reference signal is transmitted with a 4.5 dB signal level, an adjustment factor may be determined based on the 4.5 dB signal level, and the adjustment factor based on the 4.5 dB signal level may be larger than the adjustment factor based on the 3 dB signal level.

In an embodiment where access node 506 is performing power boosting, an indication of a second adjustment factor based on the increased second signal level is transmitted. For example, a reference signal or pilot signal transmitted from access node 506 with an increased signal level (e.g. over signal radius 514) may be received at wireless device 502. Accordingly, a second adjustment factor may be determined such that the received signal level of a reference signal or pilot signal transmitted with an increased signal level may be adjusted.

At step 608, signal information comprising a determined first signal level associated with the first access node and a determined second signal level associated with the second access node is received from a wireless device, wherein the determined first signal level comprises a received signal level of the first signal decreased by the first adjustment factor. For example, wireless device 502 may receive a first signal, such as a reference signal or pilot signal, at a first received signal level from access node 504 and a second signal, such as reference signal or pilot signal, at a second received signal level from access node 506. In addition, the wireless device may receive the indication of the first adjustment factor from access node 504 and the indication of the second adjustment factor from access node 506. The wireless device may then calculate a compensated first signal level by decreasing the received first signal level using the first adjustment factor and a compensated second signal level by decreasing the received second signal level using the second adjustment factor.

For example, the compensated first signal level may be calculated by subtracting the first adjustment factor from the received first signal level. In another example, the compensated first signal level may be calculated by dividing the received first signal level by the first adjustment factor. Similarly, the compensated second signal level may be calculated by either subtracting the second adjustment factor from the received second signal level or dividing the received second signal level by the second adjustment factor.

In an embodiment, a reporting event may be triggered at the wireless device based on the compensated first signal level and the compensated second signal level, and a measurement report comprising the compensated first signal level and the compensated second signal level may be transmitted. The compensated first signal level and the compensated second signal level may comprise the determined first signal level and the determined second signal level. The measurement report may be received by access node 504 and/or access node 506.

At step 610, based on the signal information, one of the first access node and the second access node may be selected for communication with the wireless device. For example, based on the determined first signal level and the determined second signal level, one of the first access node and the second access node may be selected.

In an embodiment, wireless device 502 may be performing cell selection. For examples, one or more of the determined first signal and the determined second signal from a measurement report may be compared to criteria, and the selected access node may be based on the comparison. In another embodiment, wireless device 502 may be performing cell re-selection. For example, wireless device 502 may have changed from an idle state to an active state and one or more of the determined first signal level and the determined second signal level from a measurement report may be compared to criteria, and the selected access node may be based on the comparison.

In an embodiment, a reporting event may be triggered at wireless device 502, and during the reporting event, wireless device 502 may transmit a plurality of measurement reports. An access node may be selected for communication with wireless device 502 based on the plurality of measurement reports.

At step 612, the wireless device is instructed to communicate with the selected access node. For example, based on the selection from step 610, the wireless device may be instructed to communicate with one of access node 504 and access node 506. In an embodiment, wireless device 502 may be instructed to change from communicating with access node 504 to communicating with access node 506.

Figure 7:
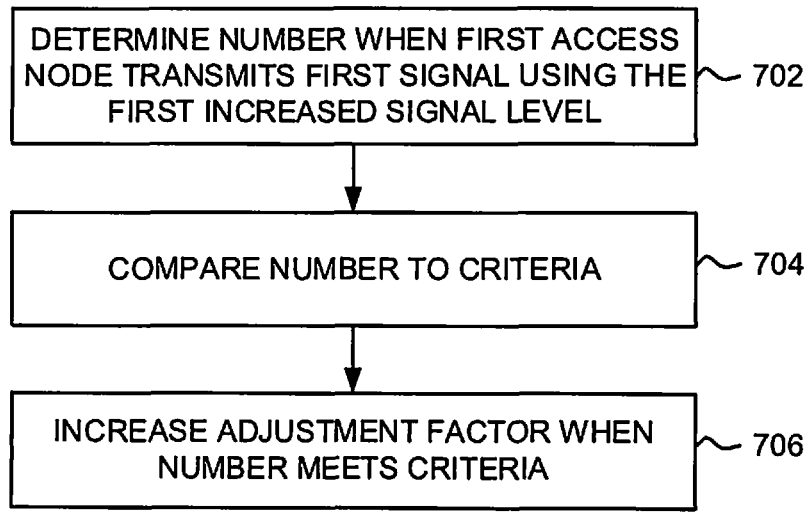
FIG. 7 illustrates an exemplary method of determining an adjustment factor.

FIG. 7 illustrates an exemplary method for determining an access node for a wireless device. The method will be discussed with reference to the exemplary communication system 500 illustrated in FIG. 5, however, the method can be implemented with any suitable communication system.

Referring to FIG. 7, at step 702, a number is determined when the first access node transmits the first signal using the increased first signal level. For example, access node 504 may be performing power boosting and may transmit a reference signal or pilot signal with an increased first signal level. While the first signal is transmitted using the increased first signal level, a number, such as a number of attempted handovers from access node 504 that failed, may be determined. In this example, attempted handovers from access node 504 may be monitored such that the number of failed handovers may be determined. The number of failed handovers may comprise a ratio of a number of failed handovers to a number of successful handovers.

In an embodiment, while the first signal is transmitted using the increased first signal level, a number, such as a number of terminated communication sessions for wireless devices in communication with access node 504, may be determined. In this example, the number of terminated communication sessions (e.g., dropped calls) for wireless devices in communication with access node 504 may be monitored.

At step 704, the determined number is compared to a criteria. For example, where the determined number comprises a number of failed handovers, the number may be compared to a failed handover criteria. Where the determined number comprises a number of terminated communication sessions, the number may be compared to a terminated communication sessions criteria. The criteria may be a threshold and may further comprise an absolute number, a percentage, or any other suitable criteria.

A step 706, the first adjustment factor is increased when the determined number meets the criteria. For example, where a determined number of failed handovers meets a failed handover criteria, the first adjustment factor may be adjusted. The determination that a number of failed handovers meets a criteria (e.g. the number of failed handovers is above a threshold) may indicate that an adjustment performed at the wireless device to a first received signal (e.g., transmitted with an increased first signal level) is not large enough. Accordingly, the adjustment factor transmitted from access node 504 may be increased such that a wireless device that receives the adjustment factor may decrease a received first signal level using the increased adjustment factor. An example where a determined number of terminated communication sessions meets a terminated communication sessions criteria may be implemented in a similar manner.

Figure 8:
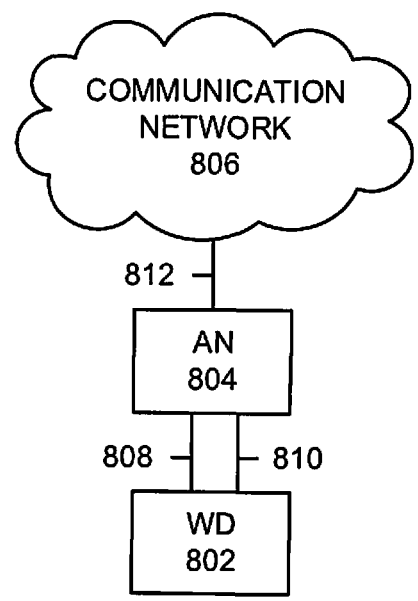
FIG. 8 illustrates another exemplary system to determine an access node for a wireless device.

FIG. 8 illustrates an exemplary communication system 800 to determine an access node for a wireless device comprising wireless devices 802, access node 804, communication network 806, and communication links 808, 810, and 812. Other network elements may be present in the communication system 800 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 804 and communication network 806 which are omitted for clarity, including additional processing nodes, routers, gateways, and physical and/or wireless data links for carrying data among the various network elements.

Wireless device 802 can be any device configured to communicate over communication system 800 using a wireless communication link. For example, wireless device 802 can include a cell phone, a smart phone, a computing platform such as a laptop, palmtop, or a tablet, a personal digital assistant, or an internet access device, and combinations thereof. It is noted that while one wireless device is illustrated in FIG. 8 as being in communication with each of access node 804, any number of wireless devices can be implemented.

Access nodes 804 is a network node capable of providing wireless communications to wireless device 802, and can be, for example, a base transceiver station, a radio base station, an eNodeB device, or an enhanced eNodeB device. Access node 804 may communicate with communication network 806 over communication link 812. In an embodiment, access node 804 can comprise a serving access node for wireless device 802.

Communication network 806 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 806 can be capable of carrying voice information and other information, for example, to support communications by a wireless device such as wireless device 802. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 806 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 806 may also comprise a wireless network, including base stations, wireless communication nodes, telephony switches, internet routers, network gateways, computer systems, communication links, or some other type of communication equipment, and combinations thereof.

Communication links 808, 810, and 812 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

In operation, wireless device 802 may communicate with access node 804 over at least two frequency bands. For example, wireless device 802 may communicate with access node 804 using a first frequency band over communication link 808 and a second frequency band over communication link 810. In this example, the first and second frequency bands may comprise varying signal radii, and wireless device 802 may be instructed to communicate with access node 804 over one of the first frequency band and the second frequency band based on, for example, a location of the wireless device. In an embodiment where wireless device 802 communicates with access node 804 over communication link 808 using the first frequency band, access node 804 may instruct wireless device 802 to change to communicating with access node 804 over communication link 810 using the second frequency band.

Figure 9:
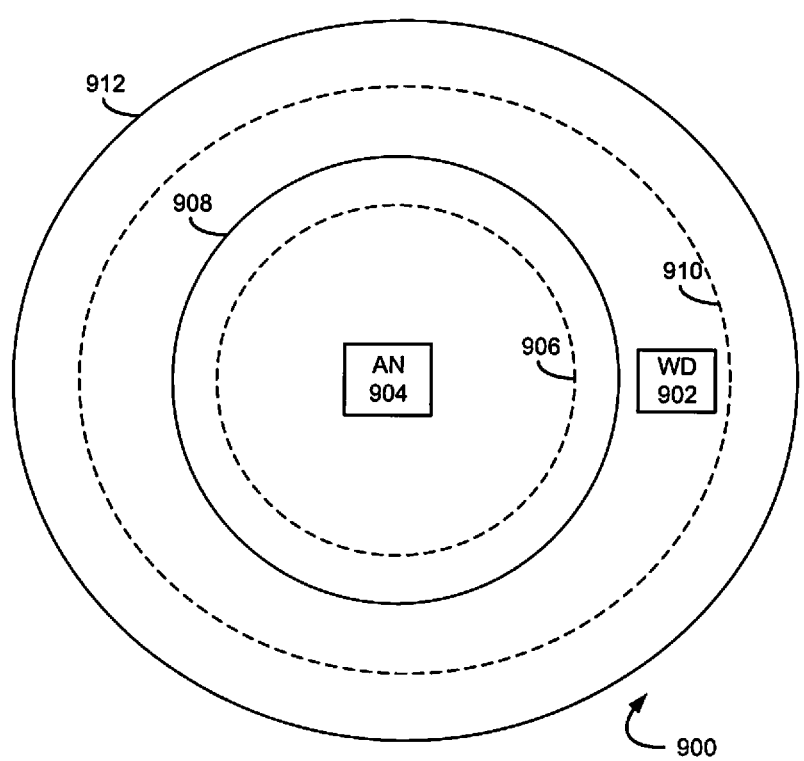
FIG. 9 illustrates another exemplary system to determine an access node for a wireless device.

FIG. 9 illustrates an exemplary communication system 900 for determining an access node for a wireless device. System 900 comprises wireless device 902, and access node 904. Wireless device 902 may comprise a device similar to wireless device 802 of FIG. 8. Similarly, access node 904 may comprise an access node similar to access node 804 of FIG. 8. Access node 904 may comprise signal radii 906, 908, 910 and 912.

In operation, wireless device 902 may establish communication with access node 904 such that access node 904 provides the wireless devices access to a communication network. Access node 904 may transmit a plurality of references signals or pilot signals over a plurality of frequency bands. For example, access node 904 may transmit a first reference signal or pilot signal over a first frequency band and a second reference signal or pilot signal over a second frequency band. In an embodiment, access node 904 may perform power boosting, as described herein. For example, access node 904 may transmit a first reference signal or pilot signal using a first frequency band over signal radius 906 when power boosting is not performed and may transmit the reference signal or pilot signal using the first frequency band over signal radius 908 when power boosting is performed. Additionally, access node 904 may transmit a second reference signal or pilot signal using a second frequency band over signal radius 910 when power boosting is not performed and may transmit the reference signal or pilot signal using the second frequency band over signal radius 912 when power boosting is performed. In an embodiment, power boosting may be performed for a reference signal transmitted over only the first frequency band, only the second frequency band, or a combination of these.

In some scenarios, transmitting a reference signal over a first frequency band with an increased power may cause interference with communicating wireless devices. For example, when power boosting is performed and the reference signal radius transmitted over a first frequency band is expanded, other signals transmitted from the access node over the first frequency band, such as bearer signals, control signals, and any other suitable signals, may not comprise such an expanded radius. This can result in the reference signal radius for the first frequency band being larger than the signal radius for other signals. In this example, a wireless device that detects a power boosted reference signal over the first frequency band may be out of range for other signals transmitted over the first frequency band.

In an embodiment, a handover to an access node performing power boosting may be attempted due to an increased reference signal level detected at a wireless device. For example, the wireless device may detect a reference signal transmitted over a first frequency band at an increased signal level, and attempt a handover based on the detected signal level. This attempted handover may fail because of the discrepancy in signal radii described above. In another embodiment, a wireless device may not be handed over from a first frequency band based on an increased reference signal level detected at the wireless device. For example, the wireless device may be out of range for signals from the power boosting wireless device other than the reference signal (e.g., bearer signals, control signals, and the like), but the wireless device may not be handed over from the first frequency band because of the increased reference signal level detected at the wireless device. Accordingly, a handover may be attempted, but the wireless device may already be out of the range necessary to successfully perform the handover, and the handover may therefore fail. These signal mismatches between reference signal radius and other signal radii can result in service interruptions such as dropped calls, lagging or poor quality media streams, or other service interruptions. In an embodiment, an access node that performs power boosting may provide a wireless device a mechanism to compensate for the received reference signal or pilot signal from that access node.

Figure 10:
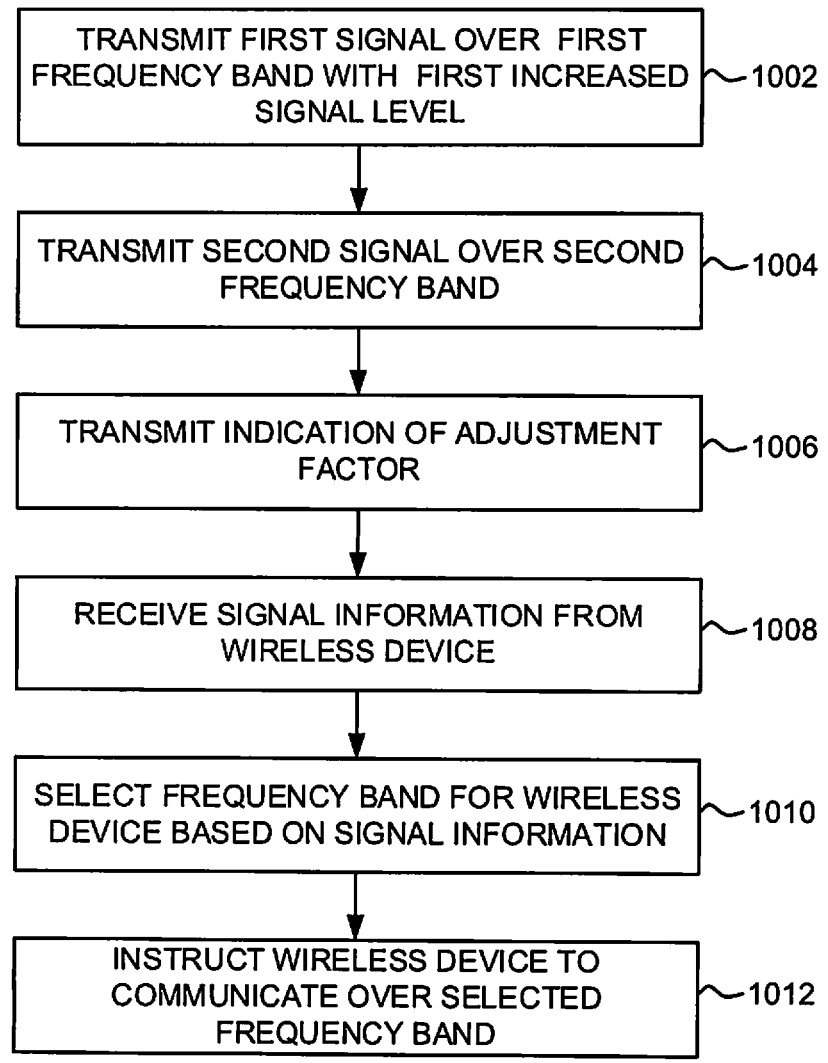
FIG. 10 illustrates another exemplary method of determining an access node for a wireless device.

FIG. 10 illustrates an exemplary method for determining an access node for a wireless device. The method will be discussed with reference to the exemplary communication system 900 illustrated in FIG. 9, however, the method can be implemented with any suitable communication system.

Referring to FIG. 10, at step 1002, a first signal comprising an increased first signal level is transmitted from a first access node over a first frequency band. For example, access node 904 may be performing power boosting and may transmit a reference signal or pilot signal with an increased first signal level over a first frequency band. The increased first signal level may comprise 3 dB, 4.5 dB, 6 dB, or any other suitable level. In an embodiment, signal radius 906 may illustrate the signal radius of a reference signal or pilot signal transmitted without an increased signal level over the first frequency band and signal radius 908 may illustrate the signal radius of a reference signal or pilot signal transmitted with an increased signal level over the first frequency band.

At step 1004, a second signal comprising second signal level is transmitted from the first access node over a second frequency band. For example, access node 904 may be performing power boosting and may transmit a reference signal or pilot signal with an increased second signal level over a second frequency band. The increased second signal level may comprise 3 dB, 4.5 dB, 6 dB, or any other suitable level. In another example, access node 904 may transmit the second signal over the second frequency band without an increased signal level. In an embodiment, signal radius 910 may illustrate the signal radius of a reference signal or pilot signal transmitted without an increased signal level and signal radius 912 may illustrate the signal radius of a reference signal or pilot signal transmitted with an increased signal level.

At step 1006, an indication of a first adjustment factor based on the increased first signal level is transmitted. For example, a reference signal or pilot signal transmitted from access node 904 over a first frequency band with an increased first signal level (e.g. over signal radius 908) may be received at wireless device 902. In a scenario, wireless device 902 may attempt a handover based on the received signal, however the attempt may end in failure because of a signal radius mismatch between a signal radius for the reference signal or pilot signal and signal radii for other signals (e.g., bearer signals, control signals, and the like). Accordingly, a first adjustment factor may be determined such that the received signal level of a reference signal or pilot signal transmitted with an increased signal level over the first frequency band may be adjusted.

In an embodiment where the second signal is transmitted with an increased signal level, an indication of a second adjustment factor based on the increased second signal level is transmitted. For example, a reference signal or pilot signal transmitted from access node 904 over a second frequency band with an increased first signal level (e.g. over signal radius 912) may be received at wireless device 902. Accordingly, a second adjustment factor may be determined such that the received signal level of a reference signal or pilot signal transmitted with an increased signal level over the second frequency band may be adjusted.

At step 1008, signal information comprising a determined first signal level associated with the first frequency band and a determined second signal level associated with the second frequency band is received from a wireless device, wherein the determined first signal level comprises a received signal level of the first signal decreased by the first adjustment factor. For example, wireless device 902 may receive a first signal, such as a reference signal or pilot signal, at a first received signal level over the first frequency band and a second signal, such as reference signal or pilot signal, at a second received signal level over the second frequency band. In addition, the wireless device may receive the indication of the first adjustment factor and the indication of the second adjustment factor. The wireless device may then calculate a compensated first signal level by decreasing the received first signal level using the first adjustment factor and a compensated second signal level by decreasing the received second signal level using the second adjustment factor.

For example, the compensated first signal level may be calculated by subtracting the first adjustment factor from the received first signal level. In another example, the compensated first signal level may be calculated by dividing the received first signal level by the first adjustment factor. Similarly, the compensated second signal level may be calculated by either subtracting the second adjustment factor from the received second signal level or dividing the received second signal level by the second adjustment factor.

In an embodiment, a reporting event may be triggered at the wireless device based on the compensated first signal level and the compensated second signal level, and a measurement report comprising the compensated first signal level and the compensated second signal level may be transmitted. The measurement report may be received by access node 904.

At step 1010, based on the signal information, one of the first frequency band and the second frequency band may be selected for communication with the wireless device. For example, based on the determined first signal level and the determined second signal level, one of the first frequency band and the second frequency band may be selected.

In an embodiment, wireless device 902 may be performing cell selection. For examples, one or more of the determined first signal and the determined second signal from a measurement report may be compared to criteria, and the selected access node may be based on the comparison. In another embodiment, wireless device 902 may be performing cell re-selection. For example, wireless device 902 may have changed from an idle state to an active state and one or more of the determined first signal level and the determined second signal level from a measurement report may be compared to criteria, and the selected access node may be based on the comparison.

In an embodiment, a reporting event may be triggered at wireless device 902, and during the reporting event, wireless device 902 may transmit a plurality of measurement reports. An access node, such as access node 904, may receive the plurality of measurement reports and select a frequency band for communication with wireless device 902.

At step 1012, the wireless device is instructed to communicate over the selected frequency band. For example, based on the selection from step 1010, wireless device 902 may be instructed to communicate with access node 904 over one of the first frequency band and the second frequency band. In an embodiment, wireless device 902 may be instructed to change from communicating over the first frequency band to communicating over the second frequency band.

In an embodiment, the method of FIG. 7 may be used in combination with the method of FIG. 10. The method will be discussed with reference to the exemplary communication system 900 illustrated in FIG. 9, however, the method can be implemented with any suitable communication system.

Referring to FIG. 7, at step 702, a number is determined when the first access node transmits the first signal using the increased first signal level. For example, access node 904 may be performing power boosting and may transmit a reference signal or pilot signal over a first frequency band with an increased first signal level. While the first signal is transmitted over the first frequency band using the increased first signal level, a number, such as a number of attempted handovers from the first frequency band of access node 904 that failed, may be determined. In this example, attempted handovers may be monitored such that the number of failed handovers may be determined. The number of failed handovers may comprise a ratio of a number of failed handovers to a number of successful handovers.

In an embodiment, while the first signal is transmitted using the increased first signal level over the first frequency band, a number, such as a number of terminated communication sessions for wireless devices in communication with access node 904 over the first frequency band, may be determined. In this example, the number of terminated communication sessions (e.g., dropped calls) for wireless devices in communication with access node 904 over the first frequency band may be monitored.

At step 704, the determined number is compared to a criteria. For example, where the determined number comprises a number of failed handovers, the number may be compared to a failed handover criteria. Where the determined number comprises a number of terminated communication sessions, the number may be compared to a terminated communication sessions criteria. The criteria may be a threshold and may further comprise an absolute number, a percentage, or any other suitable criteria.

A step 706, the first adjustment factor is increased when the determined number meets the criteria. For example, where a determined number of failed handovers meets a failed handover criteria, the first adjustment factor may be adjusted. The determination that a number of failed handovers meets a criteria (e.g. the number of failed handovers is above a threshold) may indicate that an adjustment performed at the wireless device to a first received signal (e.g., transmitted with an increased first signal level over the first frequency band) is not large enough. Accordingly, the adjustment factor transmitted from access node 904 may be increased such that a wireless device that receives the adjustment factor may decrease a received first signal level using the increased adjustment factor. An example where a determined number of terminated communication sessions meets a terminated communication sessions criteria may be implemented in a similar manner.

Figure 11:
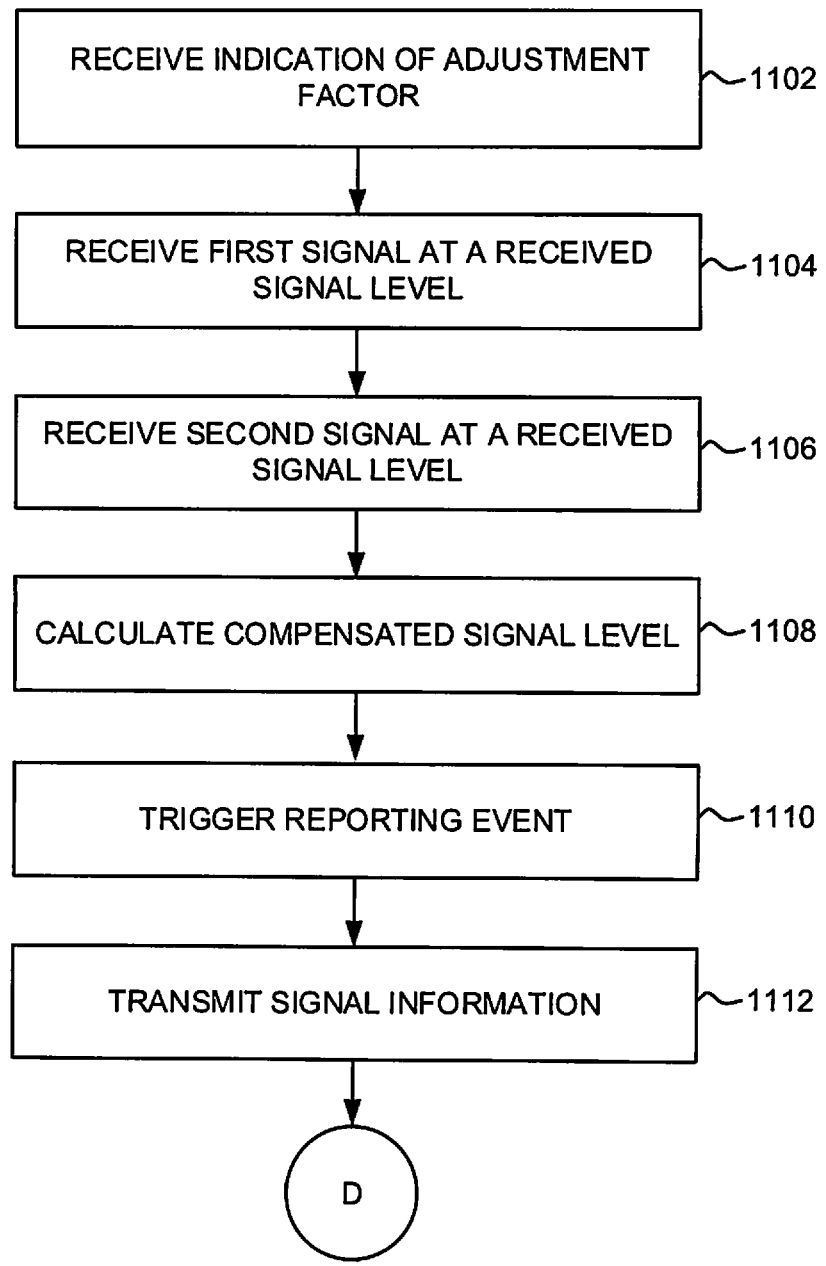
FIG. 11 illustrates another exemplary method of determining an access node for a wireless device.

FIG. 11 illustrates an exemplary method for determining an access node for a wireless device. The method will be discussed with reference to the exemplary communication system 500 illustrated in FIG. 5 and communication system 900 illustrated in FIG. 9, however, the method can be implemented with any suitable communication system.

Referring to FIG. 11, at step 1102, an indication of a first adjustment factor is received at a wireless device. For example, an indication of a first adjustment factor may be transmitted from access node 504 and received at wireless device 502. In another example, an indication of a first adjustment factor may be transmitted from access node 904 over a first frequency band and received at wireless device 902. The first adjustment factor may be determined at the transmitting access node and may be used to calculate a compensated signal level at the wireless device.

In an embodiment, an indication of a first adjustment factor and an indication of a second adjustment factor are received at the wireless device. For example, an indication of a first adjustment factor may be transmitted from access node 504 and an indication of a second adjustment factor may be transmitted from access node 506, and both of these indications may be received at wireless device 502. In another example, an indication of a first adjustment factor may be transmitted from access node 904 over a first frequency band and an indication of a second adjustment factor may be transmitted from access node 904 over a second frequency band, and both of these indications may be received at wireless device 902.

At step 1104, a first signal is received at the wireless device at a first signal level. For example, a first signal, such as a reference signal or pilot signal, may be transmitted from access node 504 with an increased signal level and may be received at wireless device 502 at a received first signal level. In another example, a first signal, such as a reference signal or pilot signal, may be transmitted from access node 904 over a first frequency band with an increased signal level and may be received at wireless device 902 at a received first signal level. In an embodiment, the first signal may be received at a first time, such as a first point in time.

At step 1106, a second signal is received at the wireless device at a second signal level. For example, a second signal, such as a reference signal or pilot signal, may be transmitted from access node 506 and may be received at wireless device 502 at a received second signal level. In another example, a second signal, such as a reference signal or pilot signal, may be transmitted from access node 904 over a second frequency band and may be received at wireless device 902 at a received second signal level. In an embodiment, the second signal may be received at the first time.

At step 1108, a compensated first signal level is calculated. For example, wireless device 502 may calculate a compensated first signal level by decreasing the received first signal level by the first adjustment factor. In another example, wireless device 902 may calculate a compensated first signal level by decreasing the received first signal level by the first adjustment factor In an embodiment, the compensated first signal level may be calculated by subtracting the first adjustment factor from the received first signal level. In another example, the compensated first signal level may be calculated by dividing the received first signal level by the first adjustment factor.

In an embodiment where an indication of a second adjustment factor is received at the wireless device, a compensated second signal level is calculated. For example, wireless device 502 may calculate a compensated second signal level by decreasing the received second signal level by the second adjustment factor. In another example, wireless device 902 may calculate a compensated second signal level by decreasing the received second signal level by the second adjustment factor In an embodiment, the compensated second signal level may be calculated by subtracting the second adjustment factor from the received second signal level. In another example, the compensated second signal level may be calculated by dividing the received second signal level by the second adjustment factor.

At step 1110, a reporting event may be triggered based on the compensated first signal level. For example, the compensated first signal level may be compared to a threshold, the compensated second signal level, the received second signal level, or any other suitable criteria, and the comparison may trigger a reporting event at the wireless device. A reporting event may comprise an event where a wireless device transmits measurement reports comprising signal information to an access node. For example, the wireless device may transmit a plurality of measurement reports at various time intervals.

In an example, a triggered reporting event may comprise an A1 event. Here, the compensated first signal level minus a hysteresis may be compared to a threshold. This can be expressed as $First\_Signal_{comp} - Hys_{A1} > Thresh_{A1}$, where $First\_Signal_{comp}$=Compensated First Signal Level, $Hys_{A1}$=Hysteresis for an A1 event, and $Thresh_{A1}$=Threshold for an A1 event. The reporting event may be triggered when the compensated first signal level minus the hysteresis is greater than the threshold.

In an example, a triggered reporting event may comprise an A2 event. Here, the compensated first signal level plus a hysteresis may be compared to a threshold. This can be expressed as $First\_Signal_{comp} + Hys_{A2} < Thresh_{A2}$, where $First\_Signal_{comp}$=Compensated First Signal Level, $Hys_{A2}$=Hysteresis for an A2 event, and $Thresh_{A2}$=Threshold for an A2 event. The reporting event may be triggered when the compensated first signal level plus the hysteresis is less than the threshold.

In an example, a triggered reporting event may comprise an A3 event. Here, the compensated second signal level minus a hysteresis plus one or more offsets may be compared to the compensated first signal level plus one or more offsets. This can be expressed as $Second\_Signal_{comp}-Hys_{A3}+Offsets_{A3}>First\_Signal_{comp}+Offsets_{A3}$, where $First\_Signal_{comp}$=Compensated First Signal Level, $Hys_{A3}$=Hysteresis for an A3 event, $Offsets_{A3}$=Offsets for an A3 event, and $Second\_Signal_{comp}$=Compensated Second Signal Level. The reporting event may be triggered when the compensated second signal level minus the hysteresis plus the offsets is greater than the compensated first signal level plus the offsets. The $Offsets_{A3}$ may comprise one or more of a frequency specific offset for an access node or a cell, a cell specific offset for an access node or a cell, or any other suitable offset. The $Offsets_{A3}$ added to the $First\_Signal_{comp}$ may comprise the same offsets, different offsets, or a subset of the offsets added to the $Second\_Signal_{comp}$. In an embodiment, an indication of a second adjustment factor may not be received at the wireless device, and the compensated second signal level may comprise the received second signal level for the reporting event calculations.

In an example, a triggered reporting event may comprise an A4 event. Here, the compensated second signal level plus offsets minus a hysteresis may be compared to a threshold. This can be expressed as $Second\_Signal_{comp}+Offsets_{A4}-Hys_{A4}>Thresh_{A4}$, where $Second\_Signal_{comp}$=Compensated Second Signal Level, $Hys_{A4}$=Hysteresis for an A4 event, $Offsets_{A4}$=Offsets for an A4 event, and $Thresh_{A4}$=Threshold for an A4 event. The reporting event may be triggered when the compensated second signal level plus the offsets minus the hysteresis is greater than the threshold. The $Offsets_{A4}$ may comprise one or more of a frequency specific offset for an access node or a cell, a cell specific offset for an access node or a cell, or any other suitable offset. The $Offsets_{A4}$ added to the $First\_Signal_{comp}$ may comprise the same offsets, different offsets, or a subset of the offsets added to the $Second\_Signal_{comp}$.

In an embodiment, a triggered reporting event may comprise a B1 event. Here, the B1 event may be implemented similar to an A4 event, where the $Second\_Signal_{comp}$ comprises a second signal from an Inter-Radio Access Technology (RAT), and the hysteresis, offsets, and thresholds may comprise B1 event values and/or inter-RAT values.

In an example, a triggered reporting event may comprise an A5 event. Here, the compensated first signal level plus a hysteresis may be compared to a first threshold and the compensated second signal level plus offsets minus a hysteresis may be compared to a second threshold. This can be expressed as $First\_Signal_{comp}+First\ Hys_{A5}<First\ Thresh_{A5}$ AND $Second\_Signal_{comp}+Offsets_{A5}-Second\_Hys_{A5}>Second\ Thresh_{A5}$, where $First\_Signal_{comp}$=Compensated First Signal Level, $First\ Hys_{A5}$=First Hysteresis for an A5 event, $First\ Thresh_{A5}$=First Threshold for an A5 event, $Second\_Signal_{comp}$=Compensated Second Signal Level, $Second\_Hys_{A5}$=Second Hysteresis for an A5 event, $Offsets_{A5}$=Offsets for an A5 event, and $Second\ Thresh_{A5}$=Second Threshold for an A5 event. The reporting event may be triggered when the compensated first signal level plus the first hysteresis is less than the first threshold and the compensated second signal level plus the offsets minus the second hysteresis is greater than a second threshold. The $Offsets_{A5}$ may comprise one or more of a frequency specific offset for an access node or a cell, a cell specific offset for an access node or a cell, or any other suitable offset. The $Offsets_{A5}$ added to the $First\_Signal_{comp}$ may comprise the same offsets, different offsets, or a subset of the offsets added to the $Second\_Signal_{comp}$. In an embodiment, an indication of a second adjustment factor may not be received at the wireless device, and the compensated second signal level may comprise the received second signal level for the reporting event calculations.

In an embodiment, a triggered reporting event may comprise a B2 event. Here, the B2 event may be implemented similar to an A5 event, where the $Second\_Signal_{comp}$ comprises a second signal from an Inter-Radio Access Technology (RAT), and the hysteresis, offsets, and thresholds may comprise B2 event values and/or inter-RAT values.

In an example, a triggered reporting event may comprise an A6 event. Here, the compensated second signal level minus a hysteresis plus one or more offsets may be compared to the compensated first signal level plus one or more offsets. This can be expressed as $Second\_Signal_{comp}-Hys_{A6}+Offsets_{A6}>First\_Signal_{comp}+Offsets_{A6}$, where $First\_Signal_{comp}$=Compensated First Signal Level, $Hys_{A6}$=Hysteresis for an A6 event, $Offsets_{A6}$=Offsets for an A6 event, and $Second\_Signal_{comp}$=Compensated Second Signal Level. The reporting event may be triggered when the compensated second signal level minus the hysteresis plus the offsets is greater than the compensated first signal level plus the offsets. The $Offsets_{A6}$ may comprise one or more of a frequency specific offset for an access node or a cell, a cell specific offset for an access node or a cell, an offset parameter for the A6 event, or any other suitable offset. The $Offsets_{A6}$ added to the $First\_Signal_{comp}$ may comprise the same offsets, different offsets, or a subset of the offsets added to the $Second\_Signal_{comp}$. In an embodiment, an indication of a second adjustment factor may not be received at the wireless device, and the compensated second signal level may comprise the received second signal level for the reporting event calculations.

At step 1112, a measurement report is transmitted from the wireless device. For example, a measurement report may be transmitted from wireless device 502 that comprises the compensated first signal level and the compensated second signal level, and the measurement report may be received at access node 504. In another example, a measurement report may be transmitted from wireless device 902 that comprises the compensated first signal level and the compensated second signal level, and the measurement report may be received at access node 904. In an embodiment, a plurality of measurement reports may be transmitted at intervals based on, for instance, a determined reporting event interval. In an embodiment, the indication of a second adjustment factor may not be received, and the measurement report may comprise the compensated first signal level and the received second signal level.

Figure 12:
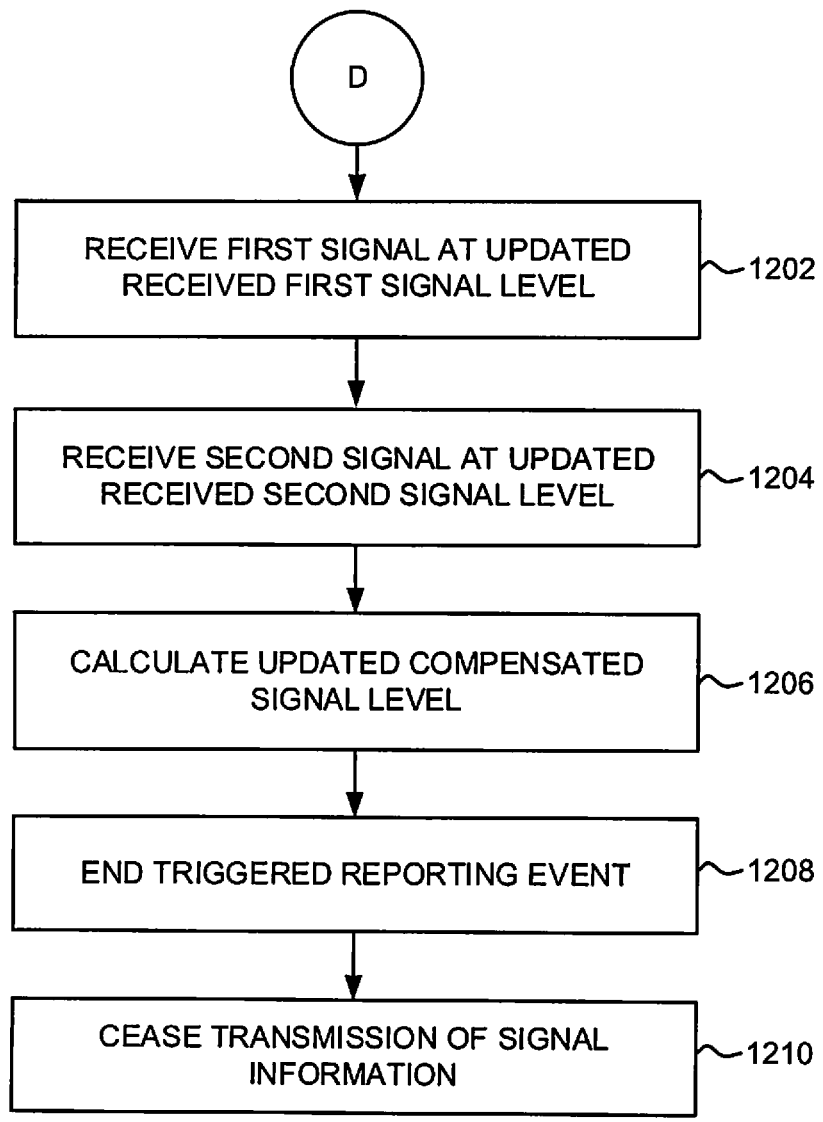
FIG. 12 illustrates another exemplary method of determining an access node for a wireless device.

FIG. 12 illustrates an exemplary method for determining an access node for a wireless device. The method will be discussed with reference to the exemplary communication system 500 illustrated in FIG. 5 and communication system 900 illustrated in FIG. 9, however, the method can be implemented with any suitable communication system.

Referring to FIG. 12, at step 1202, a first signal is received at the wireless device at an updated first signal level. The first signal may be received at the updated first signal level at a second time, such as a second point in time after the first point in time. For example, a first signal, such as a reference signal or pilot signal, may be transmitted from access node 504 with an increased signal level and may be received at wireless device 502 at a received updated first signal level. In another example, a first signal, such as a reference signal or pilot signal, may be transmitted from access node 904 over a first frequency band with an increased signal level and may be received at wireless device 902 at a received updated first signal level.

At step 1204, a second signal is received at the wireless device at an updated second signal level. For example, a second signal, such as a reference signal or pilot signal, may be transmitted from access node 506 with an increased signal level and may be received at wireless device 502 at a received updated second signal level. In another example, a second signal, such as a reference signal or pilot signal, may be transmitted from access node 904 over a second frequency band with an increased signal level and may be received at wireless device 902 at a received updated second signal level.

At step 1206, an updated compensated first signal level is calculated. For example, wireless device 502 may calculate an updated compensated first signal level by decreasing the updated received first signal level by the first adjustment factor. In another example, wireless device 902 may calculate an updated compensated first signal level by decreasing the updated received first signal level by the first adjustment factor. In an embodiment, the updated compensated first signal level may be calculated in a similar manner to the compensated first signal level calculated in step 1108 of FIG. 11.

In an embodiment where an indication of a second adjustment factor is received at the wireless device, an updated compensated second signal level is calculated. For example, wireless device 502 may calculate an updated compensated second signal level by decreasing the updated received second signal level by the second adjustment factor. In another example, wireless device 902 may calculate an updated compensated second signal level by decreasing the updated received second signal level by the second adjustment factor. In an embodiment, the updated compensated second signal level may be calculated in a similar manner to the compensated second signal level calculated in step 1108 of FIG. 11.

At step 1208, a reporting event may be ended based on the updated compensated first signal level. For example, the updated compensated first signal level may be compared to a threshold, the updated compensated second signal level, the received updated second signal level, or any other suitable criteria, and the comparison may end a triggered reporting event at the wireless device.

In an example, an ended reporting event may comprise an A1 event. Here, the updated compensated first signal level plus a hysteresis may be compared to a threshold. This can be expressed as $First\_Signal_{comp}+Hys_{A1}<Thresh_{A1}$, where $First\_Signal_{comp}$=Updated Compensated First Signal Level, $Hys_{A1}$=Hysteresis for an A1 event, and $Thresh_{A1}$=Threshold for an A1 event. The reporting event may be ended when the updated compensated first signal level plus the hysteresis is less than the threshold.

In an example, an ended reporting event may comprise an A2 event. Here, the updated compensated first signal level minus a hysteresis may be compared to a threshold. This can be expressed as $First\_Signal_{comp}-Hys_{A2}>Thresh_{A2}$, where $First\_Signal_{comp}$=Updated Compensated First Signal Level, $Hys_{A2}$=Hysteresis for an A2 event, and $Thresh_{A2}$=Threshold for an A2 event. The reporting event may be ended when the updated compensated first signal level minus the hysteresis is greater than the threshold.

In an example, an ended reporting event may comprise an A3 event. Here, the updated compensated second signal level plus a hysteresis and one or more offsets may be compared to the updated compensated first signal level plus one or more offsets. This can be expressed as $Second\_Signal_{comp}+Hys_{A3}+Offsets_{A3}<First\_Signal_{comp}+Offsets_{A3}$, where $First\_Signal_{comp}$=Updated Compensated First Signal Level, $Hys_{A3}$=Hysteresis for an A3 event, $Offsets_{A3}$=Offsets for an A3 event, and $Second\_Signal_{comp}$=Updated Compensated Second Signal Level. The reporting event may be ended when the updated compensated second signal level plus the hysteresis and the offsets is less than the updated compensated first signal level plus the offsets. The $Offsets_{A3}$ may comprise one or more of a frequency specific offset for an access node or a cell, a cell specific offset for an access node or a cell, or any other suitable offset. The $Offsets_{A3}$ added to the $First\_Signal_{comp}$ may comprise the same offsets, different offsets, or a subset of the offsets added to the $Second\_Signal_{comp}$. In an embodiment, an indication of a second adjustment factor may not be received at the wireless device, and the updated compensated second signal level may comprise the updated received second signal level for the reporting event calculations.

In an example, an ended reporting event may comprise an A4 event. Here, the updated compensated second signal level plus a hysteresis and one or more offsets may be compared to a threshold. This can be expressed as $Second\_Signal_{comp}+Offsets_{A4}+Hys_{A4}<Thresh_{A4}$, where $Second\_Signal_{comp}$=Updated Compensated Second Signal Level, $Hys_{A4}$=Hysteresis for an A4 event, $Offsets_{A4}$=Offsets for an A4 event, and $Thresh_{A4}$=Threshold for an A4 event. The reporting event may be ended when the updated compensated second signal level plus the hysteresis and the offsets is less than the threshold. The $Offsets_{A4}$ may comprise one or more of a frequency specific offset for an access node or a cell, a cell specific offset for an access node or a cell, or any other suitable offset. The $Offsets_{A4}$ added to the $First\_Signal_{comp}$ may comprise the same offsets, different offsets, or a subset of the offsets added to the $Second\_Signal_{comp}$.

In an embodiment, an ended reporting event may comprise a B1 event. Here, the B1 event may be implemented similar to an A4 event, where the $Second\_Signal_{comp}$ comprises a second signal from an Inter-Radio Access Technology (RAT), and the hysteresis, offsets, and thresholds may comprise B1 event values and/or inter-RAT values.

In an example, an ended reporting event may comprise an A5 event. Here, the updated compensated first signal level minus a hysteresis may be compared to a first threshold and the updated compensated second signal level plus a hysteresis and one or more offsets may be compared to a second threshold. This can be expressed as $First\_Signal_{comp}-First\ Hys_{A5}>First\ Thresh_{A5}$ AND $Second\_Signal_{comp}+Second\_Hys_{A5}+Offsets_{A5}<Second\ Thresh_{A5}$, where $First\_Signal_{comp}$=Updated Compensated First Signal Level, $First\ Hys_{A5}$=First Hysteresis for an A5 event, $First\ Thresh_{A5}$=First Threshold for an A5 event, $Second\_Signal_{comp}$=Updated Compensated Second Signal Level, $Second\_Hys_{A5}$=Second Hysteresis for an A5 event, $Offsets_{A5}$=Offsets for an A5 event, and $Second\ Thresh_{A5}$=Second Threshold for an A5 event. The reporting event may be ended when the updated compensated first signal level minus the first hysteresis is greater than the first threshold and the updated compensated second signal level plus the second hysteresis and the offsets is less than a second threshold. The $Offsets_{A5}$ may comprise one or more of a frequency specific offset for an access node or a cell, a cell specific offset for an access node or a cell, or any other suitable offset. The Offsets$_{A5}$ added to the First_Signal$_{comp}$ may comprise the same offsets, different offsets, or a subset of the offsets added to the Second_Signal$_{comp}$. In an embodiment, an indication of a second adjustment factor may not be received at the wireless device, and the updated compensated second signal level may comprise the updated received second signal level for the reporting event calculations.

In an embodiment, an ended reporting event may comprise a B2 event. Here, the B2 event may be implemented similar to an A5 event, where the Second_Signal$_{comp}$ comprises a second signal from an Inter-Radio Access Technology (RAT), and the hysteresis, offsets, and thresholds may comprise B2 event values and/or inter-RAT values.

In an example, an ended reporting event may comprise an A6 event. Here, the updated compensated second signal level plus a hysteresis and one or more offsets may be compared to the updated compensated first signal level plus one or more offsets. This can be expressed as Second_Signal$_{comp}$+Hys$_{A6}$+Offsets$_{A6}$<First_Signal$_{comp}$+Offsets$_{A6}$, where First_Signal$_{comp}$=Updated Compensated First Signal Level, Hys$_{A6}$=Hysteresis for an A6 event, Offsets$_{A6}$=Offsets for an A6 event, and Second_Signal$_{comp}$=Updated Compensated Second Signal Level. The reporting event may be ended when the updated compensated second signal level plus the hysteresis plus the offsets is less than the updated compensated first signal level plus the offsets. The Offsets$_{A6}$ may comprise one or more of a frequency specific offset for an access node or a cell, a cell specific offset for an access node or a cell, an offset parameter for the A6 event, or any other suitable offset. The Offsets$_{A6}$ added to the First_Signal$_{comp}$ may comprise the same offsets, different offsets, or a subset of the offsets added to the Second_Signal$_{comp}$. In an embodiment, an indication of a second adjustment factor may not be received at the wireless device, and the updated compensated second signal level may comprise the updated received second signal level for the reporting event calculations.

At step 1210, the wireless device ceases to transmit measurement reports. For example, during a reporting event, measurement reports may be periodically transmitted from wireless device 502 that comprise the compensated first signal level and the compensated second signal level, and the measurement reports may be received at access node 504. In another example, during a reporting event, measurement reports may be periodically transmitted from wireless device 902 that comprise the compensated first signal level and the compensated second signal level, and the measurement reports may be received at access node 904. When the reporting event is ended, the wireless device (e.g., wireless device 502 or wireless device 902) may cease to transmit the periodic measurement reports to the respective access node (e.g., access node 504 or access node 904).

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 13:
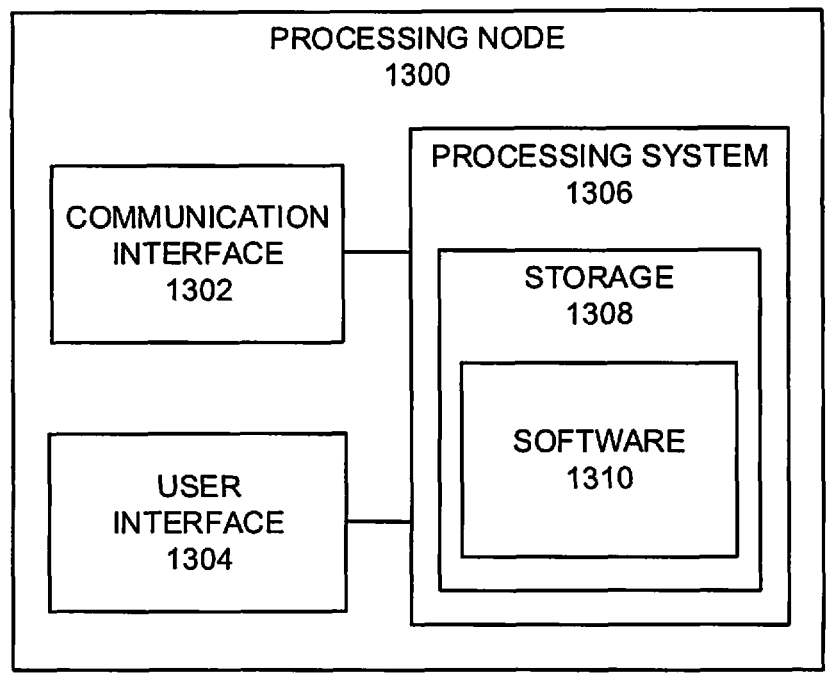
FIG. 13 illustrates an exemplary processing node.

FIG. 13 illustrates an exemplary processing node 1300 in a communication system. Processing node 1300 comprises communication interface 1302, user interface 1304, and processing system 1306 in communication with communication interface 1302 and user interface 1304. Processing node 1300 can be configured to determine a communication access node for a wireless device. Processing system 1306 includes storage 1308, which can comprise a disk drive, flash drive, memory circuitry, or other memory device. Storage 1308 can store software 1310 which is used in the operation of the processing node 1300. Storage 1308 may include a disk drive, flash drive, data storage circuitry, or some other memory apparatus. Software 1310 may include computer programs, firmware, or some other form of machine-readable instructions, including an operating system, utilities, drivers, network interfaces, applications, or some other type of software. Processing system 1306 may include a microprocessor and other circuitry to retrieve and execute software 1310 from storage 1008. Processing node 1300 may further include other components such as a power management unit, a control interface unit, etc., which are omitted for clarity. Communication interface 1302 permits processing node 1300 to communicate with other network elements. User interface 1304 permits the configuration and control of the operation of processing node 1300.

Examples of processing node 1300 include controller node 408 and gateway node 410. Processing node 1300 can also be an adjunct or component of a network element, such as an element of access nodes 104, 106, 404, 406, or 904. Processing node 1300 can also be another network element in a communication system. Further, the functionality of processing node 1300 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for determining an access node for a wireless device, the method comprising:
   transmitting from a first access node to the wireless device a first signal including a power boosted reference signal, the first signal being associated with an increased first signal level;
   detecting a failure of a handover between the wireless device and the first access node, wherein the handover is initiated by the wireless device based on the increased first signal level;
   upon detecting the failure of the handover, determining, by the first access node, a first adjustment factor based on the increased first signal level, and transmitting the first adjustment factor to the wireless device;
   receiving, from the wireless device, a compensated first signal level associated with the first access node and a second signal level associated with a second access node, wherein the compensated first signal level is calculated by the wireless device by decreasing the increased first signal level received from the first access node using the first adjustment factor;
   selecting, based on the compensated first signal level and the second signal level, one of the first access node and the second access node for communication with the wireless device; and
   instructing the wireless device to communicate with the selected one of the first access node and the second access node.

2. The method of claim 1, further comprising:
   transmitting from the first access node the first adjustment factor when the wireless device is in active communication with the first access node; and
   instructing the wireless device to change from communicating with the first access node to communicating with the second access node when the second access node is selected for communication with the wireless device.

3. The method of claim 1, wherein selecting one of the first access node and the second access node for communication with the wireless device is performed when the wireless device is in an idle state.

4. The method of claim 1, wherein the second signal level further comprises a received signal level of a second signal decreased by a second adjustment factor received from the second access node at the wireless device.

5. The method of claim 1, wherein decreasing the increased first signal level received from the first access node using the first adjustment factor comprises dividing the first signal level by the first adjustment factor.

6. The method of claim 1, wherein decreasing the first signal level received from the first access node using the first adjustment factor comprises subtracting the first adjustment factor from the first signal level.

7. The method of claim 1, further comprising:
   determining a number of failed handovers from the first access node when the first signal is transmitted using the increased first signal level; and
   increasing the first adjustment factor when the number of failed handovers meets a first criteria.

8. The method of claim 7, wherein the number of failed handovers comprises a ratio of a number of failed handovers to a number of successful handovers.

9. The method of claim 1, further comprising:
   determining a number of terminated communication sessions for wireless devices in communication with the first access node when the first signal is transmitted using the increased first signal level;
   increasing the first adjustment factor when the number of terminated communication sessions meets a second criteria.

10. A method for determining an access node for a wireless device, the method comprising:
    receiving, at the wireless device, a first signal from a first access node at a first signal level and a second signal from a second access node at a second signal level, wherein the first signal includes a power boosted reference signal and is transmitted from the first access node with an increased power;
    initiating a handover by the wireless device based on the first signal level of the first signal, the handover resulting in a handover failure;
    receiving, from the first access node, a first adjustment factor determined by the first access node upon detecting the handover failure;
    calculating, by the wireless device, a compensated first signal level by decreasing the first signal level using the first adjustment factor; and
    transmitting signal information that includes the compensated first signal level and the received second signal level to the first access node.

11. The method of claim 10, further comprises:
    determining that the compensated first signal level minus a first hysteresis is less than the second signal level plus a first offset.

12. The method of claim 10, further comprising:
    receiving, from the first access nodes, instructions to change from communicating with the first access node to communicating with the second access node.

13. The method of claim 10, further comprising:
    receiving at the wireless device at a second time the first signal at an updated first signal level and the second signal at an updated second signal level;
    calculating an updated compensated first signal level by decreasing the updated first signal level by the first adjustment factor;
    ending a reporting event based on the updated compensated first signal level and the updated second signal; and
    ceasing to transmit the signal information.

14. The method of claim 13, wherein ending the reporting event further comprises:
    determining that the compensated first signal level plus a first hysteresis is greater than the second signal level plus a first offset.

15. The method of claim 10, wherein decreasing the first signal level using the first adjustment factor comprises dividing the first signal level by the first adjustment factor.

16. The method of claim 10, wherein decreasing the first signal level using the first adjustment factor comprises subtracting the first adjustment factor from the first signal level.

17. A method for determining an access node for a wireless device, the method comprising:
    transmitting, from a first access node, a first signal over a first frequency band at an increased first signal level and a second signal over a second frequency band at a second signal level, wherein the first signal includes a power boosted reference signal;
    detecting a failure of a handover between the wireless device and the first access node, wherein the handover is initiated by the wireless device based on the increased first signal level;

upon detecting the failure of the handover, determining, by the first access node, a first adjustment factor based on the increased first signal level, and transmitting the first adjustment factor to the wireless device;

receiving, from the wireless device, a compensated first signal level associated with the first frequency band and a second signal level associated with the second frequency band, wherein the compensated first signal level is calculated by the wireless device by decreasing the increased first signal level received from the first access node using the first adjustment factor;

selecting, based on the compensated first signal level and the second signal level, one of the first frequency band the second frequency band for communication with the wireless device; and instructing the wireless device to communicate over the selected one of the first frequency band and the second frequency band.

18. The method of claim 17, wherein the second signal level further comprises a signal level of the second signal decreased by a second adjustment factor received from the second access node at the wireless device.

19. The method of claim 17, further comprising:
determining a number of failed handovers from the first frequency band when the first signal comprises the increased first signal level;
increasing the first adjustment factor when the number of failed handovers meets a first criteria.

20. The method of claim 19, wherein the number of failed handovers comprises a ratio of a number of failed handovers to a number of successful handovers.

\* \* \* \* \*